Dec. 6, 1949  K. W. HALL  2,490,625
TRANSFER MOLDING PRESS
Filed Oct. 30, 1948
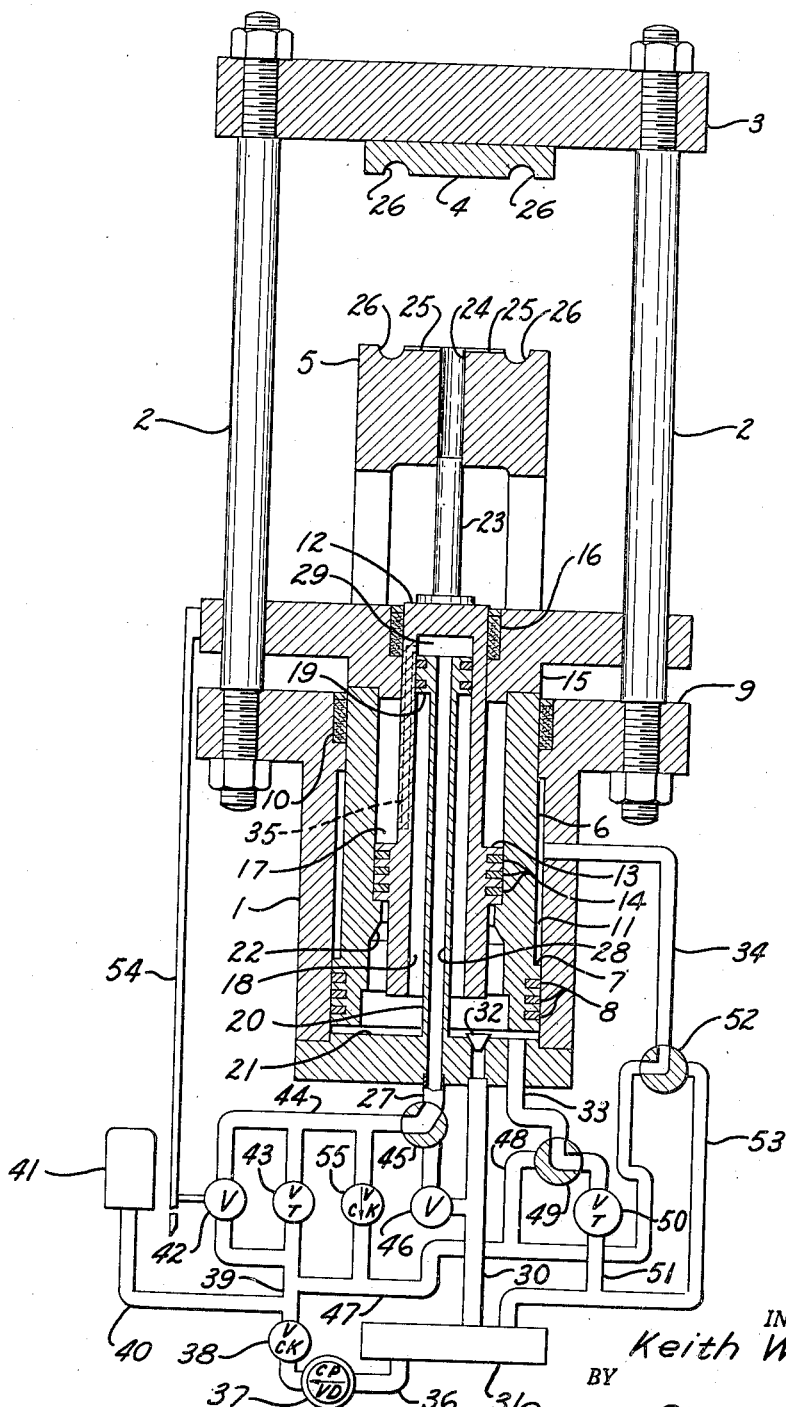
INVENTOR.
Keith W. Hall
BY
Marshall, Marshall & Leonard
ATTORNEYS Patented Dec. 6, 1949

2,490,625

UNITED STATES PATENT OFFICE 2,490,625

TRANSFER MOLDING PRESS

Keith W. Hall, Toledo, Ohio, assignor, by mesne assignments, to The Baldwin Locomotive Works, a corporation of Pennsylvania Application October 30, 1948, Serial No. 57,503

6 Claims. (Cl. 60—97)

This invention relates to hydraulic presses and in particular to an improved cylinder construction that may be embodied in the lower section of the press and that serves to close and clamp the mold as well as to transfer material from a transfer pot centrally located in the lower mold through runners located at the parting line between the mold sections and leading to mold cavities.

Transfer molding, a molding process in which thermosetting molding compounds in a semiplastic state are forced from a transfer pot into the shaping cavities of a mold, has been employed with considerable success. For the convenience of the operator both in loading the press and in removing the molded articles including the waste material, molds have been constructed with the transfer pot located in the lower mold half which may or may not be the movable member of the press. For convenience in construction as well as to enhance the appearance of the press it is desirable to keep the large mold clamping cylinder in the lower portion of the press and to support the upper mold half rigidly from the frame of the press. This keeps the bulky operating mechanism at the bottom of the press.

This arrangement presents several problems since it is difficult to arrange independently operable pistons or rams in position to successively operate the lower mold half and the transfer ram located therein. Transfer presses have been constructed in which the transfer cylinder and ram are mounted as a unit in the lower platen. While this arrangement accomplishes the desired results it is subject to the disadvantage that the molds are located at an inconvenient height because of the necessary length of the cylinders and that the hydraulic pressure for the transfer cylinder must be taken through a flexible tube or sliding connection. Such connections are usually a source of trouble requiring extensive maintenance service.

The object of this invention is to provide a telescopic arrangement of a mold clamping ram or piston and a transfer ram or piston that is of little greater height than an ordinary mold clamping cylinder and piston and that incorporates no flexible connections or sliding joints other than the sliding of the pistons in their respective telescoping cylinders.

Another object of the invention is to provide a molding press of the transfer molding type that may be economically operated from a single source of high pressure fluid.

A still further object of the invention is to arrange the telescoping cylinders with their respective pressure operating chambers so that by selective manipulation of three valves all the usual steps of a molding process may be carried out.

A still further object of the invention is to employ pressures built up in a chamber within the press accompanying a reduction in volume of such chamber to effect relative movement between telescoping portions of the structure.

A specific object of the invention is to employ the pressure within a retraction chamber between two relatively movable telescoping members to prevent relative motion between the members while the members as a unit are being moved.

More specific objects and advantages are apparent from the following description of a press operating structure constructed according to the invention.

According to the invention the improved hydraulic cylinder arrangement comprises an outer stationary hydraulic cylinder, a small stationary piston or jack ram fixedly mounted within said large cylinder, a transfer ram in the form of a cylinder telescoped over said stationary piston, and a mold clamping ram in the form of a thick walled sleeve that is telescoped over the transfer ram and that is engaged as a piston in the outer stationary cylinder. Retraction chambers are provided between the outer hydraulic cylinder and the thick walled sleeve and between the interior of the thick walled sleeve and the transfer ram. Ordinarily four hydraulic connections are made to the assembly, one being through the stem of the stationary piston and opening into the space above its upper end, a second being a large capacity passage leading from a fluid reservoir to the interior of the large stationary cylinder which passage is closed by a check valve preventing flow from the chamber, a third connection that leads from a source of high pressure and opens into the space at the bottom of the stationary cylinder, and a fourth connection that leads into the retraction space between the thick walled mold-closing ram and the stationary cylinder. The second and third connections may be combined by relocating the check valve. Also, the transfer ram is provided with a duct leading from the space within the ram and above the stationary piston to the lower end of the retraction chamber formed between the transfer ram and the thick walled mold-clamping sleeve.

Three-way valves arranged for independent operation are included in the hydraulic connections between a high pressure pump or other source of high pressure fluid and the hydraulic connections leading up through the stem of the stationary piston, into the space at the bottom of the stationary cylinder, and into the retraction chamber between the thick walled sleeve and the stationary cylinder.

The operation of this cylinder arrangement depends upon the proper proportioning of the effective areas of the various chambers to which hydraulic fluid may be admitted. Thus the area of the stationary piston is the smallest of any of the effective areas. The retraction chambers between the thick walled sleeve and the outer cylinder and between the thick walled sleeve and the transfer ram are second and third in either order. The only requirement is that they are each larger than the stationary piston. The effective area of the transfer ram against which pressure in the bottom of the stationary cylinder acts is fourth while the effective area of the thick walled mold-clamping sleeve is the largest single effective area.

A molding cycle as carried out with the improved press, starting just after the removal of a previously molded piece, includes the steps of first admitting high pressure through the stem of the stationary piston into the space above such piston within the transfer ram. This pressure acting between the head of the stationary piston and the transfer ram drives the transfer ram upwardly. This pressure is also transmitted through the duct to the retraction chamber between the transfer ram and the thick walled mold-clamping sleeve wherein it acts to prevent relative movement between the transfer ram and the sleeve thus forcing the sleeve to move upwardly with the transfer ram (assuming that the retraction chamber in the cylinder is open to exhaust). As the transfer ram and mold clamping cylinder are elevated hydraulic fluid is drawn into the bottom of the stationary cylinder through the check valve so that this chamber is filled with fluid without the expenditure of any high pressure fluid other than that admitted through the stem of the stationary piston.

After a short upward travel of the transfer ram and mold-clamping sleeve the high pressure is cut off to stop the mold to enable the operator to place inserts into the cavities if such are required and to load the transfer pot. The high pressure fluid is then reapplied through the stem of the stationary piston to complete the upward stroke of the mold. After the mold is closed, high pressure fluid is admitted to the bottom of the stationary cylinder where it acts against the bottom end of the side walls of the transfer ram and against the lower end of the thick walled mold-clamping sleeve. The pressure acting against the thick walled sleeve clamps the mold in its closed position while the pressure acting against the lower end of the transfer ram drives it upwardly with moderate force. Full force is not obtained at this step because the fluid in the hydraulic cylinder in moving the transfer ram must eject high pressure fluid from the retraction chamber around the transfer ram and cause such fluid to flow against the high pressure out through the stem of the stationary piston. As soon as the transfer ram has moved far enough to apply pressure to the molding material in the transfer pot the first valve is turned to reduce the pressure in the stem of the stationary piston thus reducing the pressure from the retraction chamber and allowing the hydraulic fluid in the stationary cylinder to exert more force against the transfer ram thus building up enough force to quickly eject the material from the transfer pot.

If desired, the mold-clamping pressure may be increased toward the end of the transfer step by again connecting the stationary piston to the high pressure source so that the force exerted in the retraction chamber around the transfer ram which reacts on the thick walled sleeve is effective in supplementing the pressure acting on the bottom end of the thick walled sleeve.

As soon as the article has hardened the mold is opened by applying high pressure fluid to the retraction chamber in the stationary cylinder and exhausting the interior of the cylinder to the fluid reservoir through a restricted passage. During this time the stationary piston is also connected to the reservoir. The high pressure acting in the outside retraction chamber drives the thick walled sleeve downwardly while the restriction in the outlet passage maintains some back pressure in the stationary cylinder. This back pressure acting against the lower end of the transfer ram drives the transfer ram upwardly with respect to the descending thick walled sleeve so that any residue of material left in the transfer pot is discharged as the mold opens.

As the mold travels toward its fully open position the transfer ram is retracted relative to the thick walled sleeve by applying high pressure fluid through the stationary piston so that pressure acting in the retraction chamber around the transfer ram drives the transfer ram downwardly with respect to the thick walled mold-clamping sleeve. The movement of the mold is not affected by this pressure because high pressure is maintained within the outside retraction chamber thus exerting a downward force on the sleeve that is greater than the upward force applied through the stationary piston. This retraction of the transfer ram and mold completes the cycle of operations.

The above cycle of operations are carried out using a minimum of high pressure fluid and using that fluid without appreciable throttling. The only throttling actually employed consists in throttling the flow to the stationary piston toward the end of the upward travel of the mold to prevent damage to the mold, the throttling of the discharge from the stationary piston to regulate the transfer force and the throttling of the discharge from the stationary cylinder to effect the advance of the transfer ram during the opening of the mold.

A transfer molding press constructed according to the invention is illustrated in the accompanying drawing in which the single figure includes a cross-section through the improved cylinder arrangement and a schematic diagram of a hydraulic system for operating the press according to the invention.

In a press constructed according to the invention and illustrated in simplified form in the drawing a stationary hydraulic cylinder 1 which may be supported in any conventional manner is connected through tie rods or side plates 2 to a press head 3 carrying an upper stationary mold half 4. A lower movable mold half 5 is carried on the upper end of a thick walled sleeve 6 that fits into and operates within the cylinder 1 in the manner of a piston. The lower end of the thick walled sleeve 6 has an outwardly directed annular flange 7 that is fitted with piston rings 8 and slidably mounted in the bore of the stationary cylinder 1. A closure 9 secured to the upper end of the stationary cylinder 1 carries packing rings 10 that bear on the sides of the thick walled sleeve 6 to prevent the escape of hydraulic fluid from a retraction chamber 11 surrounding the thick walled sleeve and extending from the annular flange 7 to the closure 9.

The thick walled sleeve 6 is bored throughout its length so that it may serve as a cylinder for a transfer ram 12 sliding telescopically within the thick walled sleeve. An annular radially extending flange 13 of the transfer ram 12 having piston rings 14 fits within the sleeve 6. Likewise a closure 15 secured to the upper end of the thick walled sleeve 6 carries packing rings 16 that bear against the sides of the transfer ram 12 to prevent the escape of fluid from a retraction chamber 17 surrounding the transfer ram 12.

The transfer ram 12 is itself bored throughout the greater portion of its length to provide a cylindrical chamber 18 slidably receiving a stationary piston 19 set on the upper end of a piston stem 20 erected from a base 21 of the stationary hydraulic cylinder 1. Steps 22 formed on the inner wall of the thick walled sleeve 6 cooperate with the lower surface of the annular flange 13 to limit the relative downward movement of the transfer ram 12 with respect to the thick walled sleeve 6 and thus with respect to the piston 19.

At its upper end the transfer ram 12 carries a transfer punch 23 the upper end of which forms the bottom of a transfer pot 24. The discharge end—the upper end—of this transfer pot 24 is connected through runners 25 recessed into the upper surface of the lower mold half 5 to mold cavities 26 of the mold.

If desired, conventional ejection pins and an ejection grid may be included in the lower mold half 5 and arranged to eject molded articles from the cavities 26 as soon as the press is fully opened.

In one press constructed according to the invention the effective area of the stationary piston 19 is 11 square inches, the effective area of the annular flange 13 forming an end of the retraction chamber 17 is 22 square inches, the effective area of the flange 7 forming a bottom end of the retraction chamber 11 is 19 square inches. The effective area of the transfer ram against which pressure in the lower part of the hydraulic cylinder 1 may act is 39.8 square inches and the effective area of the bottom of the thick walled sleeve 6 including the flange 7 is 81.1 square inches. These specific areas or sizes are illustrative only and are mentioned to show the relative proportioning of the various areas so that the press may operate according to the invention. The exact proportions need not be followed, the only requirement being that the stationary piston be the smallest and the effective areas exposed to cylinder pressure be in the mentioned order.

There are four hydraulic connections for admitting or exhausting fluid from the various retraction chambers and operating spaces within the improved cylinder arrangement. All of these connections are made through the base 21 or side wall of the stationary hydraulic cylinder 1. These hydraulic connections include a first connection 27 that leads up through a duct 28 in the stem 20 of the stationary piston 19 and opens into a chamber 29 above the stationary piston 19. A second connection 30 leads directly from a fluid reservoir 31 and opens into the space within the stationary cylinder 1 past a check valve 32. This check valve permits fluid to be drawn into the cylinder 1 whenever the pressure within such cylinder drops below atmospheric pressure. A third connection 33 opens directly into the cylinder space within the hydraulic cylinder 1 while a fourth connection 34 opens through a side wall of the cylinder 1 into the retraction chamber 11 surrounding the thick walled sleeve 6.

Hydraulic fluid in the chamber 29 above the stationary piston 19 may flow or exert pressure through a duct 35 leading from the upper end of the chamber 29 to the lower end of the retraction chamber 17. This duct 35 may be produced by drilling the side wall from its upper or lower end and drilling suitable transverse holes leading into the longitudinally drilled holes and then blocking the unused portions of the drilled holes. Alternatively the transfer ram 12 may be constructed as a composite structure having telescoped sleeves forming its side walls and having the duct 35 milled into such sleeves before they are assembled together to form the ram 12.

In the operation of the press hydraulic fluid is drawn from the reservoir 31 through a pipe 36 to a constant-pressure variable-delivery hydraulic pump 37. The pump 37 discharges through a check valve 38 to a high pressure line 39 which is connected through a branch line 40 to a pressure accumulator 41. The high pressure lead 39 is connected through a cam operated cutoff valve 42 and parallelly connected throttling valve 43 to a lead 44 and three way valve 45. The valve 45 connects the lead 44 to the hydraulic connection 27 leading through the piston stem 20 and stationary piston 19 to the chamber 29 and the retraction chamber 17. The third connection of the valve 45 is through a side lead and a pressure control valve 46 into a pipe discharging to the fluid reservoir 31. Another lead 47 connected directly to the high pressure lead 39 is connected through a branch lead 48 to a second three way valve 49 and through such valve to the connection 33 opening directly into the bottom of the hydraulic cylinder 1. The third connection of the valve 49 is taken through a manually adjustable throttling valve 50 and duct 51 leading to the reservoir 31. A third three way valve 52 is arranged to connect the pipe 34 leading to the retraction chamber 11 to either the high pressure lead 47 or an exhaust lead 53 leading back to the reservoir 31.

The cutoff valve 42 is operated by a cam 54 the cam being connected to the moving platen or mold half 5 or to the upper end of the thick walled mold-clamping sleeve 6 whichever is the more convenient. The cam 54 and valve 42 are arranged so that the valve 42 is open during the greater portion of the stroke of the press and is closed just before the mold halves come together.

The sequence of operations of the valves 45, 49 and 52 in connection with a molding cycle is substantially as follows: At the position shown in the drawings the mold 5 with its clamping sleeve 6 and the transfer ram 12 with its punch 23 are in fully retracted positions to which they were driven when the valves 45, 49 and 52 were set to the positions indicated. (These valves are shown in simple schematic form it being understood that valves suitable for operating under the high pressures employed in hydraulic presses will be employed in the construction of an actual press.) In the position shown high pressure has been admitted through the piston stem 20 to the chamber 29 over the stationary piston 19 and through this chamber and duct 35 to the retraction chamber 17 to drive the transfer ram 12 to the bottom end of its stroke in the thick walled mold-clamping sleeve 6. Likewise the high pressure admitted through the valve 52 to the retraction chamber 11 drove the thick walled sleeve 6 in its lowermost position.

From this position the mold is raised to loading position by operation of the valve 52 which, releasing the pressure in the retraction chamber 11, permits the pressure over the piston 19 to raise the entire assembly of the transfer ram 12 and mold clamping sleeve 6. As these members move up fluid is ejected from the retraction chamber 11 to the reservoir 31 at the same time that fluid is drawn through the check valve 32. After a short upward movement the valve 45 is turned to an intermediate position at which the connection 27 is isolated to trap fluid in the cylinder and hold the assembly at whatever height it may have reached. This height is sufficient to retract any ejector pins so that inserts may be positioned in the cavities 26 and molding powder, either as a powder or in the form of preforms, may be loaded into the transfer chamber 24.

After the mold and transfer chamber are loaded high pressure is again admitted to the connection 27 through the valve 45 so that the assembly is raised to mold closed position. It should be noted that during this operation the transfer ram 12 is held in its retracted position since the relative force acting between the sleeve 6 and transfer ram 12 by a pressure fluid in the retraction chamber 17 is approximately twice the lifting pressure exerted in the lifting chamber 29.

As soon as the mold is closed the valve 49 is operated so that hydraulic fluid may flow through the lead 47 the valve 49 and the connection 33 into the interior of the hydraulic cylinder 1 where it acts against the lower surface of the thick walled sleeve 6 and flange 7 to clamp the mold in closed position and at the same time acts against the lower surface of the side walls of the ram 12 to urge the ram upwardly to press against the molding powder in the transfer cylinder 24. Since during the upward movement, the transfer ram 12 is acting against the high pressure fluid in the retraction chamber 17 the effective force driving the ram upwardly is only the force exerted in the chamber 29 and against a portion of the bottom end of the transfer ram equivalent in area to the cross-sectional area of the side walls of the upper portion of the ram. The fluid driven out through the duct 28 is returned to the high pressure lead 47 through a check valve 55. At this stage the valve 45 is operated to exhaust the chamber 29 through the pressure control valve 46 thereby reducing the pressure in the retraction chamber 17 to allow the pressure acting against the lower end of the transfer ram 12 to be more effective in providing the high force necessary to drive the molding material from the transfer pot 24 through the runners 25 to the mold cavities 26. The actual force applied to the punch 23 depends upon the cross-sectional area of the walls of the cylinder 12 and the back pressure from the control valve 46. In a construction having the dimensions given above, the range of adjustment of transfer force by adjustment of the control valve 46 varies from 72% to 100% of the maximum force available when the control valve 46 is wide open. This range of adjustment may be increased by decreasing the area of the stationary piston 19 and the thickness of the walls of the ram 12 while keeping the flange 13 at the same size. Near the completion of the transfer stroke high pressure may again be admitted through the valve 45 if additional clamping pressure is required to hold the mold closed at this time.

As soon as the material has hardened the three valves are operated, the valve 45 to release the pressure in the transfer retraction chamber 17, the valve 52 to apply high pressure to the retraction chamber 11, and the valve 49 to permit the escape of fluid from the stationary cylinder 1. The escape of fluid through the valve 49 is limited by the throttling valve 50 so that back pressure is maintained in the hydraulic cylinder 1 which back pressure serves to drive the transfer ram 12 to the upper limit of its stroke while the mold-clamping sleeve 6 and the mold are being driven downwardly. This relative upward movement of the transfer ram serves to eject any residue of material from the transfer pot 24 at the same time that the molded article is released from the mold cavities 26. Thus, the high pressure acting in the retraction chamber 11 drives the mold-clamping sleeve 6 downward while the transfer ram 12 is carried to the upper limit of its travel relative to the clamping sleeve 6. After the residue is ejected from the transfer pot 24 high pressure fluid is admitted through the valve 45 to the chamber 29 within the transfer ram 12 and from that chamber through the duct 35 to the retraction chamber 17. Since the area of the retraction chamber 17 is greater than the effective area of the chamber 29 the transfer ram 12 is retracted to its lowermost position, thus completing the cycle of operation.

The previously described throttling valve 43 and cam operated cutoff valve 42, connected in the line between the pressure lead 39 and the valve 45, are arranged to throttle the flow of fluid through the stationary piston 19 as the molds approach closed position thus preventing any hammering or damage from impact. These valves are merely a convenience and not a necessity since the leads 44 and connection 27 may be made sufficiently small to afford the required restriction but in that event the whole upward travel of the mold would be retarded when for protection it is only necessary to retard the last end of the travel. Therefore the valves are included to permit high speed operation through the greater portion of the length of the stroke.

The improved transfer press cylinder construction allows all the functions of an ordinary molding cycle to be performed from a single high pressure fluid source without requiring the use of any sliding joints or flexible connections and without the waste of appreciable quantities of high pressure fluid. By proper selection of the relative effective areas of the various chambers and retraction spaces the effective forces exerted by the high pressure fluid may be made just sufficient to provide reliable operation and thus secure a maximum economy of pressure fluid. The improved design also affords the advantage that all of the hydraulic connections may be brought out on one side of the hydraulic cylinder 1 so that by the use of flange connections servicing problems are materially simplified. Such an arrangement allows the complete press or merely the cylinder to be removed with a minimum disturbance of the hydraulic system.

Various modifications and specific details of construction and proportioning of areas may be made without departing from the spirit and scope of the invention.

Having described the invention, I claim:

1. In a drive for a transfer molding press, in combination, a stationary outer hydraulic cylinder, a stationary piston mounted within the stationary cylinder, a transfer ram that has a cylindrical bore cooperating with the stationary piston, a platen ram that is sleeved over said transfer ram and that serves as a piston in said stationary cylinder, said transfer ram and said platen ram having a retraction chamber therebetween, said transfer ram having a passage leading from its bore to said retracting chamber, said platen ram and said stationary cylinder having a retraction chamber therebetween, and means for selectively supplying pressure fluid to and exhausting fluid from said retraction chambers and the interior of said stationary cylinder.

2. In a drive for a transfer molding press, in combination, a stationary outer hydraulic cylinder, a stationary piston mounted within said cylinder, said piston having a fluid passage leading through its stem to the space above its face, a transfer ram that has a cylindrical bore cooperating with the stationary piston, a platen ram that is sleeved over said transfer ram and that serves as a piston in the stationary cylinder, said transfer ram and said platen ram having a retraction chamber therebetween, said transfer ram having a passage leading from its bore to said retraction chamber, said platen ram and said stationary cylinder having a retraction chamber therebetween, and means for selectively supplying pressure fluid to and exhausting fluid from said retraction chambers and the interior of said stationary cylinder.

3. In a drive for a transfer molding press, in combination, a stationary outer hydraulic cylinder, a stationary piston mounted within the stationary cylinder, a transfer ram that has a cylindrical bore cooperating with the stationary piston, a platen ram that is sleeved over said transfer ram and that serves as a piston in said stationary cylinder, said transfer ram and said platen ram having a retraction chamber therebetween, said transfer ram having a passage leading from its bore to said retracting chamber, said platen ram and said stationary cylinder having a retraction chamber therebetween, at least one check valve arranged to admit fluid to the interior of said stationary cylinder as the rams are moved by pressure acting within said transfer ram, and means for selectively supplying pressure fluid to and exhausting fluid from said retraction chambers and the interior of said stationary cylinder.

4. In a drive for a transfer molding press, in combination, a stationary cylinder, a piston and piston rod installed in the cylinder to form a piston retraction chamber around the piston rod, said piston rod having a longitudinal bore therethrough, a second piston and piston rod slidably mounted in the bore, said second piston rod being sealed at the mouth of the bore to form a retraction chamber around the second piston rod, said second piston rod being hollowed out to form a cylinder within the second piston, a stationary piston supported from the closed end of the stationary cylinder and slidably fitted in the cylinder in the second piston rod, said second piston rod having a passage from the cylinder within to the retraction chamber around it, and means for selectively applying pressure to and exhausting fluid from the stationary cylinder and the retraction chambers.

5. In a drive for a transfer molding press, in combination, a stationary outer hydraulic cylinder, a stationary piston mounted within the stationary cylinder, a transfer ram that has a cylindrical bore cooperating with the stationary piston, a platen ram that is sleeved over said transfer ram and that serves as a piston in said stationary cylinder, said transfer ram and said platen ram having a retraction chamber therebetween, said transfer ram having a passage leading from its bore to said retracting chamber, said platen ram and said stationary cylinder having a retraction chamber therebetween, means for selectively supplying pressure fluid to the retraction chambers and the stationary cylinder, and means for restricting the discharge of fluid from such spaces to maintain back pressure therein for regulating the operation of the rams.

6. A device according to claim 5 in which the flow restricting means include a pressure control valve in the discharge line from the stationary piston.

KEITH W. HALL.

No references cited.